(12) United States Patent
Peppe et al.

(10) Patent No.: US 8,797,038 B2
(45) Date of Patent: *Aug. 5, 2014

(54) HIGH VOLTAGE DC POWER FOR ELECTROMAGNETIC SURVEY SOURCE

(75) Inventors: Oliver Peppe, West Linton (GB); Prawin Bhadani, Dundee (GB)

(73) Assignee: PGS Geophysical AS, Oslo (NO)

(*) Notice: Subject to any disclaimer, the term of this patent is extended or adjusted under 35 U.S.C. 154(b) by 518 days.

This patent is subject to a terminal disclaimer.

(21) Appl. No.: 12/932,592

(22) Filed: Mar. 1, 2011

(65) Prior Publication Data

US 2012/0223718 A1 Sep. 6, 2012

(51) Int. Cl.
*G01V 3/04* (2006.01)

(52) U.S. Cl.
USPC .......................................... 324/365; 324/347

(58) Field of Classification Search
USPC .................................. 324/365, 347
See application file for complete search history.

(56) References Cited

U.S. PATENT DOCUMENTS

| | | | |
|---|---|---|---|
| 4,617,518 A | 10/1986 | Srnka | |
| 6,515,877 B1 | 2/2003 | Dinh | |
| 7,187,569 B2 | 3/2007 | Sinha et al. | |
| 7,411,399 B2 | 8/2008 | Reddig et al. | |
| 7,602,191 B2 | 10/2009 | Davidsson | |
| 7,683,625 B2 | 3/2010 | Milne et al. | |
| 7,737,698 B2 | 6/2010 | Tenghamn et al. | |
| 2013/0093426 A1* | 4/2013 | Peppe et al. | 324/365 |

FOREIGN PATENT DOCUMENTS

| | | |
|---|---|---|
| EP | 2204673 A2 | 7/2010 |
| GB | 2381137 A | 4/2003 |

OTHER PUBLICATIONS

United Kingdom Search Report for Application No. GB1203553.1, dated: Jun. 22, 2012.

* cited by examiner

*Primary Examiner* — Reena Aurora

(57) ABSTRACT

A marine electromagnetic survey system includes a power cable configured to couple to a power supply at one axial end, and to a head unit at the other end. The power supply includes a source of direct current which is coupled to the power cable. The head unit includes equipment configured to output a lower voltage at a higher current than the source of direct current. At least one electromagnetic antenna is coupled to the head unit and is configured to receive the output of the head unit equipment.

20 Claims, 5 Drawing Sheets

HIGH VOLTAGE DC POWER FOR ELECTROMAGNETIC SURVEY SOURCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of marine electromagnetic geophysical surveying apparatus and methods. More specifically, the invention relates to structures for electric power transmission to marine electromagnetic geophysical survey sources and uses thereof.

Marine electromagnetic geophysical surveying is used to infer spatial distribution of electrical conductivity of rock formations below the bottom of a body of water such as a lake or ocean. The spatial distribution of conductivity is used to assist determining the presence of hydrocarbon bearing rock formations in the subsurface, potentially resulting in cost savings by better targeting drilling operations. One type of such surveying is known as "controlled source" electromagnetic surveying ("CSEM"), which generally includes inducing a time varying electromagnetic field in the subsurface formations and measuring one or more parameters related to a response of the subsurface rock formations to the induced electromagnetic field.

Devices for inducing such electromagnetic fields are generally referred to as electromagnetic "sources" and include, among other devices, spaced apart electrodes or wire coils disposed along or at the end of a cable. The cable is typically towed by a vessel in the body of water. Time varying electric current is imparted across the electrodes or through the coils, generally from a power supply located on the vessel, to induce a time varying electromagnetic field in the water and subsequently in the subsurface formations. The electrodes may be suspended at a selected depth in the water by the use of floatation devices such as buoys, or the cable itself may be neutrally or otherwise buoyant.

In some circumstances, it may be desirable to operate the electromagnetic source at a substantial distance from the tow vessel. In particular, it is desirable in some circumstances to operate the electromagnetic source proximate the bottom of the body of water or at great depth in the water. There is a need for an electromagnetic source cable system that can operate at substantial distances from the source of current and/or at substantial depth in the water.

SUMMARY OF THE INVENTION

A marine electromagnetic survey system according to one aspect of the invention comprises a power cable configured to couple to a power supply at one axial end, and to a head unit at the other end. The power supply comprises a source of direct current electrically coupled to the power cable. The head unit comprises equipment configured to output a lower voltage at higher current than the source of direct current. The marine electromagnetic survey system further comprises at least one electromagnetic antenna coupled to the head unit and configured to receive the output of the head unit equipment.

A method for inducing an electromagnetic field in formations disposed below the bottom of a body of water according to another aspect of the invention comprises conducting direct current to equipment disposed in the body of water from a power supply located away from the equipment. The method further comprises applying output of the equipment to at least one electromagnetic antenna disposed in the body of water, wherein the equipment accepts direct current from the power supply and generates output having lower voltage and higher current than the direct current imparted thereto.

A method of marine geophysical surveying according to yet another aspect of the invention comprises inducing an electromagnetic field in formations disposed below the bottom of a body of water. The electromagnetic field comprises conducting direct current to equipment disposed in the body of water from a power supply located away from the equipment. The method further comprises applying output of the current source to at least one electromagnetic antenna disposed in the body of water, wherein the equipment accepts direct current from the power supply and generates output having lower voltage and higher current than the direct current imparted thereto. The method further comprises measuring electromagnetic response of the formations.

Other aspects and advantages of the invention will be apparent from the following description and the appended claims.

DETAILED DESCRIPTION

Figure 1:
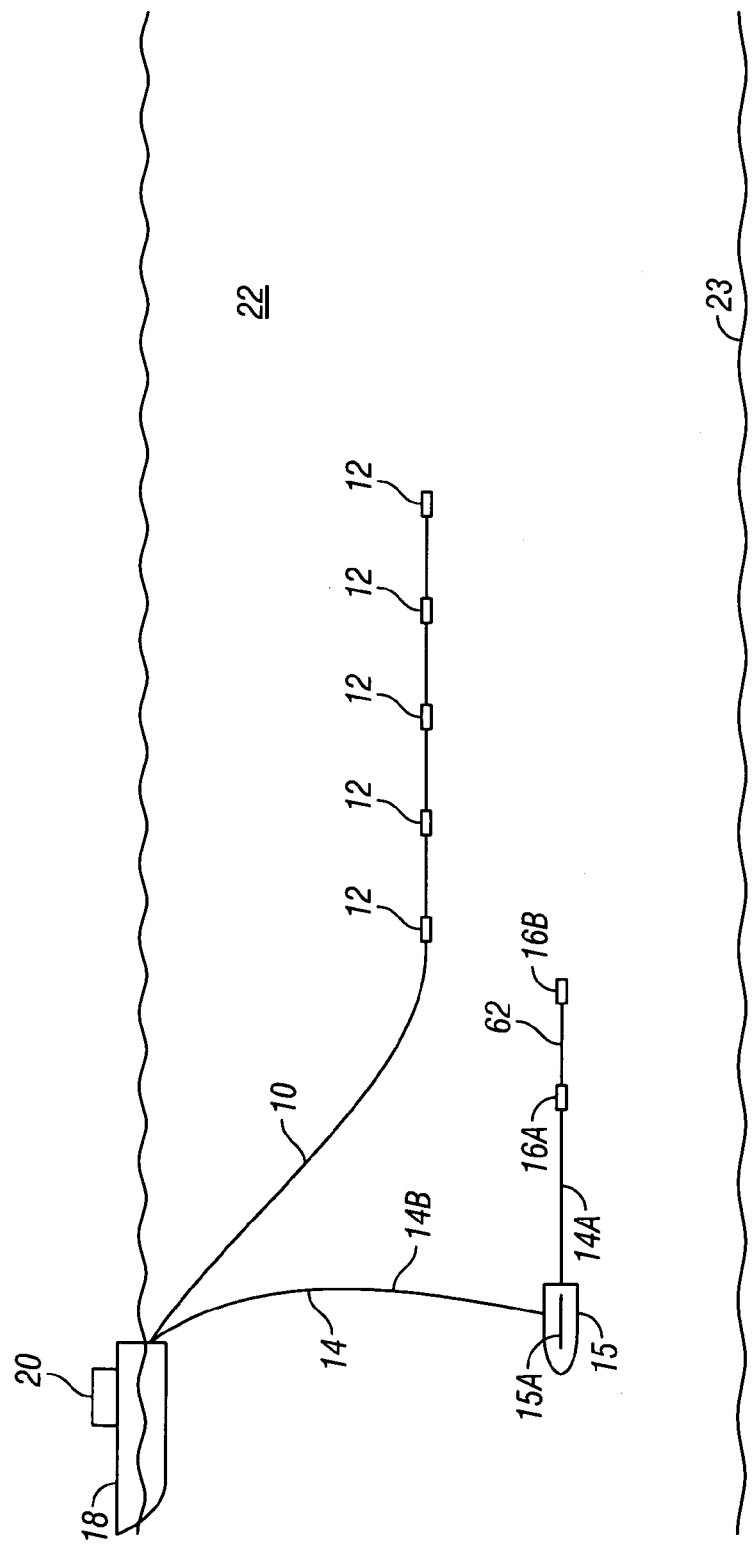
FIG. 1 shows an example embodiment of a marine electromagnetic survey system using an electromagnetic source according to the invention.

An example marine electromagnetic survey system is shown schematically in FIG. 1. The marine electromagnetic survey system may include a sensor cable 10 having thereon at longitudinally spaced apart positions a plurality of sensors 12. The sensor cable 10 is shown being towed by a survey vessel 18 moving on the surface of a body of water 22 such as a lake or ocean. The sensor cable 10 may alternatively be deployed on the water bottom 23 or towed by another vessel (not shown). As another alternative, or one or more additional sensor cables may be deployed behind the survey vessel 18, behind another vessel (not shown), or on the water bottom 23. The invention may also be used with sensor nodes (not shown), e.g., static nodes disposed on the water bottom 23. The type(s) and configuration(s) of sensors 12 are not intended to limit the scope of the present invention. The sensors 12 may be used to measure the electromagnetic response of formations below the water bottom 23 to electromagnetic field(s) imparted by the electromagnetic source, as discussed below. The sensors may measure one or more various electric field properties, such as voltage, magnetic field amplitude, and/or magnetic field gradient.

The survey vessel 18 may include thereon equipment, shown generally at 20 and referred to for convenience as a "recording system" that may include devices (none shown separately) for navigation, for energizing electromagnetic sources for imparting an electromagnetic field in the formations below the water bottom 23, and/or for recording and processing signals generated by the various sensors 12, as illustrated on the sensor cable 10.

The marine electromagnetic survey system shown in FIG. 1 includes a source cable 14 for inducing an electromagnetic field in the formations below the water bottom 23. The source cable 14 may comprise one or more antenna cable(s) 14A, a "power" or "tow" cable 14B, and a head unit 15. The "power" or "tow" cable 14B may be coupled to the survey vessel 18 and may include insulated electrical conductors, fiber optics, and a strength member (not shown separately) to serve the purposes of conducting electrical or optical signals and/or power and transmitting axial towing force from the survey vessel 18. The aft end of the power cable 14B may be coupled to head unit 15. The head unit 15 may be made from a strong, dense material, such as stainless steel or the like, and may have a weight in water selected so as to be negatively buoyant. In some embodiments, head unit 15 may cause the aft end of the power cable 14B to be submerged to a selected depth in the water depending on the amount of power cable extended from the survey vessel 18. The shape of the head unit 15 may be hydrodynamically efficient to reduce its resistance to motion in the water. The head unit 15 may define a pressure resistant interior space (as in the example illustrated in FIG. 3) wherein certain equipment may be disposed. The equipment disposed in head unit 15 may include, for example power conversion and/or switching circuits. The head unit 15 may also include control surfaces 15A to provide upward or downward thrust under motion. For example, downward thrust under motion may resist lifting of the head unit 15 from the selected depth by the action of friction in the water as the survey vessel 18 moves the power cable 14B. Such control surfaces 15A may be fixed or may be rotatable, and may be autonomous or remotely controlled. As will be explained below, the marine electromagnetic survey system of the present invention may also be used with a fixed position source antenna. In such cases, connection of the head unit 15 to the power supply may be made using a power cable which performs substantially the same electrical function as the "power" or "tow" cable 14B in FIG. 1, but which does not need to include strength members for transmitting axial towing force from the survey vessel 18.

In the present embodiment, a forward (with respect to direction of travel of survey vessel 18) end of antenna cable 14A may be coupled to the head unit 15. The antenna cable 14A may have disposed along its length an electromagnetic antenna. In some embodiments, the electromagnetic antenna comprises a first electrode 16A and a second electrode 16B spaced apart from the first electrode. In some embodiments, the aft end of the antenna cable 14A may be coupled via the first electrode 16A to a spacer rope or cable 62. The aft end of the spacer rope or cable 62 may be coupled to the second electrode 16B. Alternatively, the electrodes 16A, 16B may form an integral part of a single antenna cable 14A, or the electrodes 16A, 16B each may be disposed on a separate antenna cable. The electrodes 16A, 16B may be energized at selected times by a high voltage DC power supply 28, via power converter 30 and switch 32 (each described below) so as to induce a time varying electromagnetic field in the formations below the water bottom 23. The current may be alternating current ("AC") for frequency domain electromagnetic surveying or switched direct current (e.g., switching current on, switching current off, reversing current polarity, or sequential switching such as a pseudorandom binary sequence) for time domain electromagnetic surveying. The configuration shown in FIG. 1 induces a horizontal dipole electric field in the subsurface when the electrodes 16A, 16B are energized by the electric current. It is entirely within the scope of the present invention to induce vertical dipole electric fields in the subsurface. The type of current used to energize the electrodes is not limited to the foregoing as the invention is applicable to use with both frequency domain (continuous wave) and transient induced electromagnetic fields.

Figure 2:
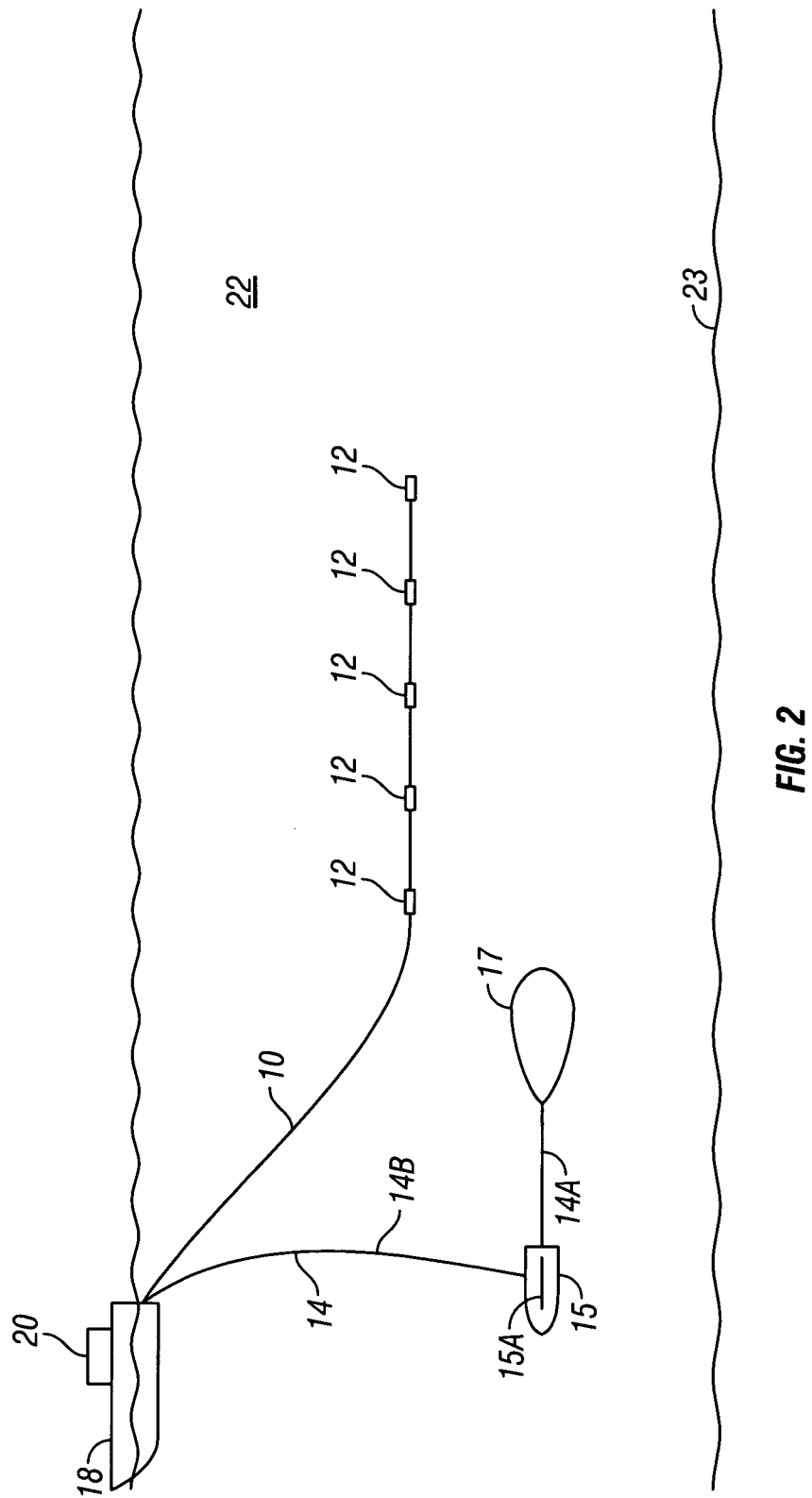
FIG. 2 shows a marine electromagnetic survey system with another example embodiment of an electromagnetic source according to the invention.

In a different embodiment, shown in FIG. 2, the electromagnetic antenna may comprise a wire loop or coil 17. When electric current is passed through the loop or coil 17 a time varying electromagnetic field is induced. The wire loop 17 shown in FIG. 2 induces a vertical magnetic dipole field when current is passed through the coil 17. It should be understood that the structure of the electrodes and/or wire loops or coils are provided herein only as examples and are not intended to limit the scope of the present invention. Accordingly, the direction of and the type of field induced is not intended to limit the scope of the invention.

In some embodiments, the antenna cable 14A may be substantially neutrally buoyant so that the antenna cable 14A operates at substantially the same depth in the water as the head unit 15. For example, the antenna cable 14A may operate as close as about 100 m or as even as close as about 50 m to the seabed. In some embodiments, the antenna may operate at a water depth of about 50 m to about 3000 m or more.

Figure 3:
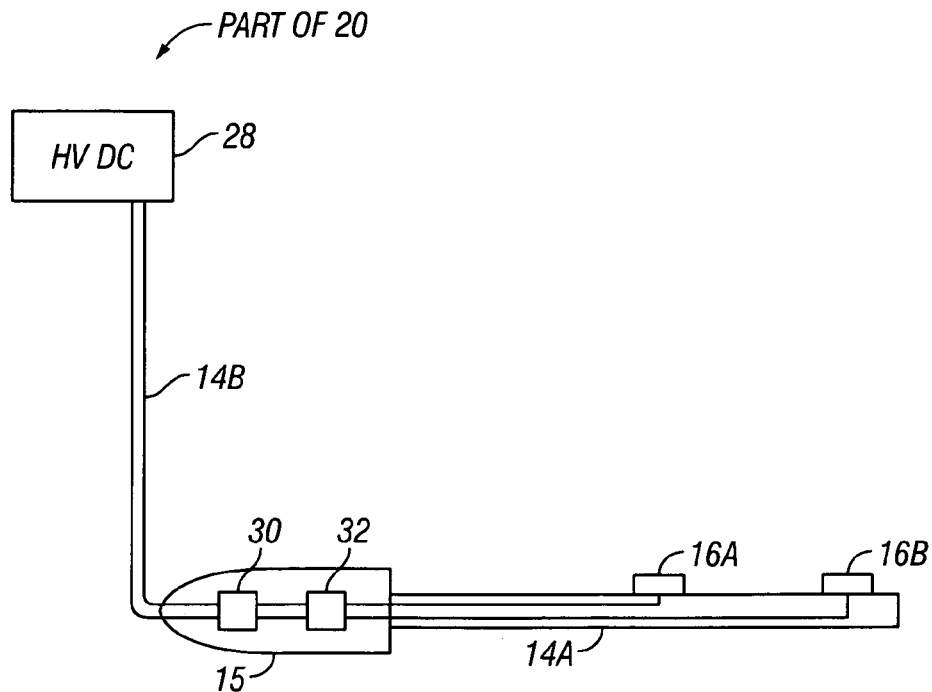
FIG. 3 shows an example embodiment of electromagnetic source circuits according to the invention.

An example embodiment of equipment disposed on the vessel (e.g., in recording system 20) and along the source cable 14 will be explained with reference to FIG. 3. The recording unit 20 may include a high voltage direct current ("DC") power supply 28. The high voltage DC power supply 28 may be a DC generator, or it may be an AC generator with or without a step up transformer, and rectifier. Alternatively the high voltage DC power supply 28 may be a motor generator set or a synchronous converter. The voltage output by the high voltage DC power supply 28 should be selected so that a selected amount of electrical power may be transmitted along the power cable 14B, while minimizing resistive losses along the power cable 14B. The selected amount of power may be the amount needed to generate a suitable amplitude electromagnetic field in the formations below the water bottom (23 in FIG. 1). In some embodiments, the selected amount of power may be in the range of about 100 kW to 1000 kW or more. In the present embodiment, the head unit 15 may include power conversion and switching circuits. For example, as illustrated in FIG. 3, head unit 15 includes a power converter 30 and an H-bridge or similar switch 32. In the present embodiment, power converter 30 may be a DC to DC power converter. The power converter 30 in such embodiment converts the high voltage DC from the power cable 14B to a low voltage, high current DC for energizing the electrodes 16A, 16B. For example, in some embodiments, the power converter 30 converts the high voltage DC from power cable 14B to a voltage of about 250 Vdc and a current of about 2500 A. The preferred output voltage of the power converter 30 will depend upon factors such as the spacing between the electrodes 16A, 16B and the electrical conductivity of the water (22 in FIG. 1). Switch 32 may be interposed in the electrical connection between the power converter 30 and the electrodes 16A, 16B. The switch 32 may be controlled by the recording unit 20 or may be remotely programmed to operate autonomously. The switch 32 may cause the current output from the power converter 30, particularly in the case of a DC to DC power converter, to be applied to the electrodes in one or more switching sequences referenced to a time index, including switching on, switching off, reversing polarity and a multiple event switching sequence, for example and without limitation, a pseudorandom binary sequence (PRBS).

In other embodiments, the equipment disposed in head unit 15 may include a waveform synthesizer (not shown separately) to generate AC output at one or more selected frequencies and/or waveforms.

Figure 4:
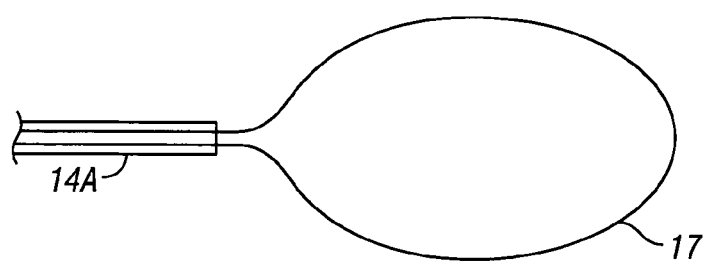
FIG. 4 shows an example embodiment of a loop or coil antenna according to the invention.

FIG. 4 shows an alternative form of electromagnetic antenna coupled to antenna cable 14A. In the present embodiment, the electromagnetic antenna may be a wire loop or coil 17 as explained with reference to FIG. 2.

A marine electromagnetic survey system made according to the various aspects of the invention may have one or more of the following advantages. First, the size of the electrical conductors in the power cable (14B in FIG. 1) may be reduced for a given amount of power needed to be transmitted along the power cable as contrasted with transmission of lower voltage along the power cable. Because DC is transmitted along the power cable (14B in FIG. 1), generation of stray electromagnetic field is substantially reduced as contrasted with using AC transmission along the power cable. Because DC is transmitted along the power cable, power loss from inductive reactance and effects of cable capacitance are substantially eliminated. Finally, the electromagnetic source may be able to operate in great water depth or at great distances from the survey vessel (18 in FIG. 1) without substantial power loss along the power cable (14B in FIG. 1).

Figure 5:
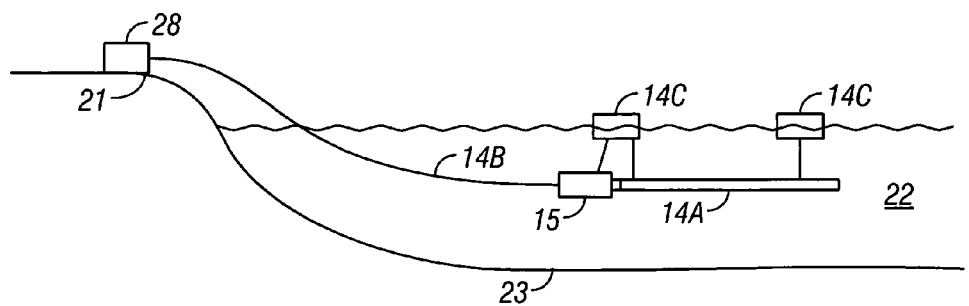
FIGS. 5 and 5A show example embodiments of an electromagnetic source having a high voltage DC power supply disposed on shore, while the electromagnetic source is located in the water at a selected distance from the shore.
Figure 5A:
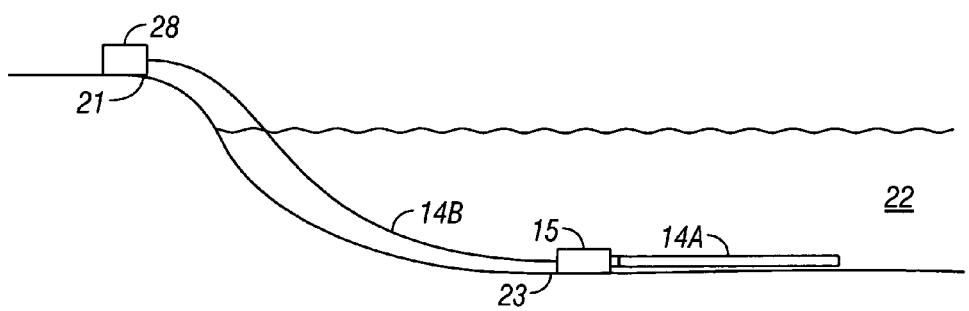

The foregoing marine electromagnetic survey system, while explained in terms of an electromagnetic antenna towed from a vessel, alternatively may be used to many of the same possible advantages with a fixed position electromagnetic antenna located at a substantial distance from the power supply. In such embodiments, the high voltage DC power supply 28 may be disposed other than on a vessel, for example operated from onshore or from a fixed structure such as a drilling rig. An example embodiment having a high voltage DC power supply 28 disposed on shore 21 is shown in FIG. 5. The power cable 14B is extended from the high voltage DC power supply 28 into a body of water 22 to a selected distance from the shore 21. The head unit 15 and antenna cable 14A may be configured substantially as previously explained herein. In the present example embodiment, the antenna cable 14A and the head unit 15 may be suspended at a selected depth in the water 22 using buoys, floats or any similar device, shown generally at 14C. In some embodiments, the antenna cable 14A and/or the head unit 15 may sit on or be secured to the water bottom 23, as illustrated in FIG. 5A.

Figure 6:
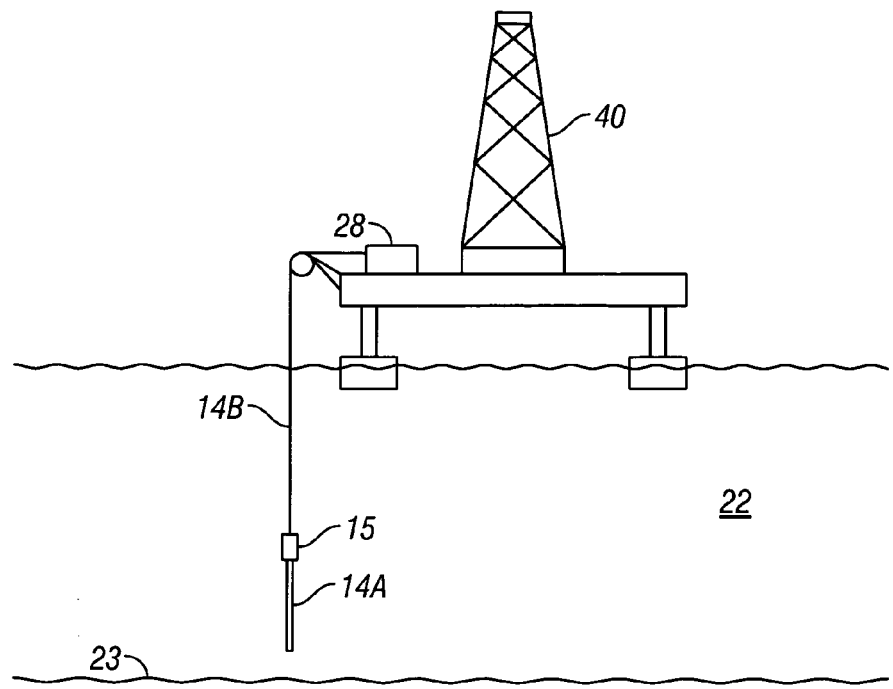
FIGS. 6 and 6A show example embodiments of an electromagnetic source having a high voltage DC power supply disposed on a drilling rig or production platform.
Figure 6A:
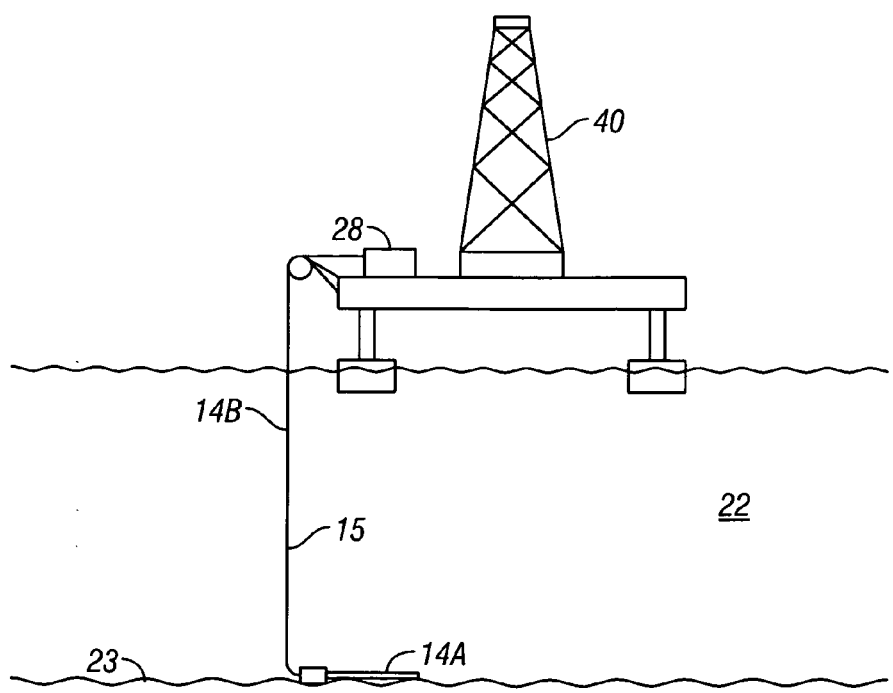

FIG. 6 shows an example embodiment of a high voltage DC power supply 28 disposed on a fixed structure such as a drilling rig or production platform 40. In the present example, the drilling rig or production platform 40 may be semisubmersible as shown, however bottom supported platforms may be used in other embodiments. The power cable 14B extends from the high voltage DC power supply 28 to a selected depth in the water 22. The head unit 15 may be coupled to the end of the power cable 14B. The antenna cable 14A may be coupled to the head unit 15 as previously explained herein. In some embodiments, the antenna cable 14A and/or the head unit 15 may sit on or be secured to the water bottom 23, as illustrated in FIG. 6A.

For such purposes as the example embodiments shown in FIG. 5 and FIG. 6, the "power" or "tow" cable indicated at 14B in FIG. 1 may not include strength members for transmitting axial towing force from the survey vessel 18, but may still provide for conducting electrical or optical signals and/or power.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A marine electromagnetic survey system, comprising:
   a power cable configured to couple to a power supply at one axial end, and to a head unit at the other end, wherein:
      the power supply comprises a source of direct current electrically coupled to the power cable at the one axial end; and
      the head unit comprises equipment configured to output a lower voltage at higher current than the source of direct current; and
   at least one electromagnetic antenna coupled to the head unit and configured to receive the output of the head unit equipment.

2. The system of claim 1 wherein the head unit equipment comprises a direct current to direct current power converter.

3. The system of claim 2 wherein the head unit equipment further comprises a switch configured to make selectable electric connection between the at least one electromagnetic antenna and the power converter.

4. The system of claim 1 wherein the at least one electromagnetic antenna comprises a pair of spaced apart electrodes.

5. The system of claim 1 wherein the at least one electromagnetic antenna composes a wire loop.

6. The system of claim 1 wherein the head unit comprises a dense material and at least one control surface configured to enable operating the head unit at a selected depth in a body of water.

7. The system of claim 1 wherein the power supply is located on board a vessel and the power cable is configured to tow the head unit from the vessel.

8. The system of claim 1 wherein the power supply is disposed at a location selected from the group of locations consisting of: onshore, a fixed structure, a drilling rig, and a production platform.

9. A method for inducing an electromagnetic field in formations disposed below the bottom of a body of water, comprising:
   conducting direct current to equipment disposed in the body of water from a power supply located away from the equipment; and
   applying output of the equipment to at least one electromagnetic antenna disposed in the body of water, wherein the equipment accepts direct current from the power supply and generates output having lower voltage and higher current than the direct current imparted thereto.

10. The method of claim 9 wherein the equipment comprises a power converter.

11. The method of claim 10 wherein the power converter comprises a direct current to direct current power converter.

12. The method of claim 10 wherein the equipment further comprises a switch configured to make selectable electric connection between the at least one electromagnetic antenna and the power converter.

13. The method of claim 9 wherein the output applied to the at least one electromagnetic antenna is in the form of switched direct current.

14. The method of claim 9 wherein the at least one electromagnetic antenna comprises at least one pair of spaced apart electrodes.

15. The method of claim 9 wherein the at least one electromagnetic antenna comprises a wire loop.

16. The method of claim 9 wherein the power supply is located on board a vessel, and the equipment is towed from the vessel.

17. The method of claim 9 wherein the power supply is disposed at a location selected from the group of locations consisting of onshore, a fixed structure, a drilling rig, and a production platform.

18. A method of marine geophysical surveying comprising:

inducing an electromagnetic field in formations disposed below the bottom of a body of water, wherein inducing the electromagnetic field comprises:

conducting direct current to equipment disposed in the body of water from a power supply located away from the equipment; and applying output of the current source to at least one electromagnetic antenna disposed in the body of water, wherein the equipment accepts direct current from the power supply and generates output having lower voltage and higher current than the direct current imparted thereto; and measuring electromagnetic response of the formations.

19. The method of claim 18 wherein measuring electromagnetic response comprises measuring at least one electromagnetic field property selected from the group of properties consisting of: voltage, magnetic field amplitude, magnetic field gradient, and any combination thereof.

20. The method of claim 18 wherein the power supply is disposed at a location selected from the group of locations consisting of: onshore, a fixed structure, a drilling rig, and a production platform.

* * * * *